US008265876B1

(12) United States Patent
Yu et al.

(10) Patent No.: US 8,265,876 B1
(45) Date of Patent: Sep. 11, 2012

(54) SEISMIC HORIZON AUTOPICKING USING ORIENTATION VECTOR FIELD

(75) Inventors: Yingwei Yu, Katy, TX (US); Clifford Lee Kelley, Sugar Land, TX (US); Irina M. Mardanova, Houston, TX (US)

(73) Assignee: IHS Global Inc., Englewood, CO (US)

( * ) Notice: Subject to any disclaimer, the term of this patent is extended or adjusted under 35 U.S.C. 154(b) by 396 days.

(21) Appl. No.: 12/543,915

(22) Filed: Aug. 19, 2009

Related U.S. Application Data

(60) Provisional application No. 61/112,725, filed on Nov. 8, 2008, provisional application No. 61/142,169, filed on Dec. 31, 2008.

(51) Int. Cl.
*G01V 1/28* (2006.01)
(52) U.S. Cl. ........................................................ 702/16
(58) Field of Classification Search ...................... 702/16
See application file for complete search history.

(56) References Cited

U.S. PATENT DOCUMENTS

| 5,056,066 A | 10/1991 | Howard |
| 5,153,858 A | 10/1992 | Hildebrand |
| 5,251,184 A | 10/1993 | Hildebrand et al. |
| 5,537,365 A | 7/1996 | Sitoh |
| 6,016,287 A | 1/2000 | Klebba et al. |

OTHER PUBLICATIONS

M. Sc. Fitsum Admasu, A Stochastic Method for Automated Matching of Horizons across a Fault in 3D Seismic Data, Magdeburg, 10. Mrz 2008, p. 1-131.*

* cited by examiner

*Primary Examiner* — Tung S Lau
(74) *Attorney, Agent, or Firm* — Blakely Sokoloff Taylor & Zafman LLP

(57) ABSTRACT

A method is disclosed for automatically extending interpreter horizon picks over a wider area of traces in such manner that the automatically generated picks are very similar to picks that an interpreter would pick manually. The method applies optical filters to seismic sections to determine the intrinsic orientation of seismic events. Seismic orientation is captured in the Orientation Vector Field, which is then used to guide the picking process.

18 Claims, 17 Drawing Sheets

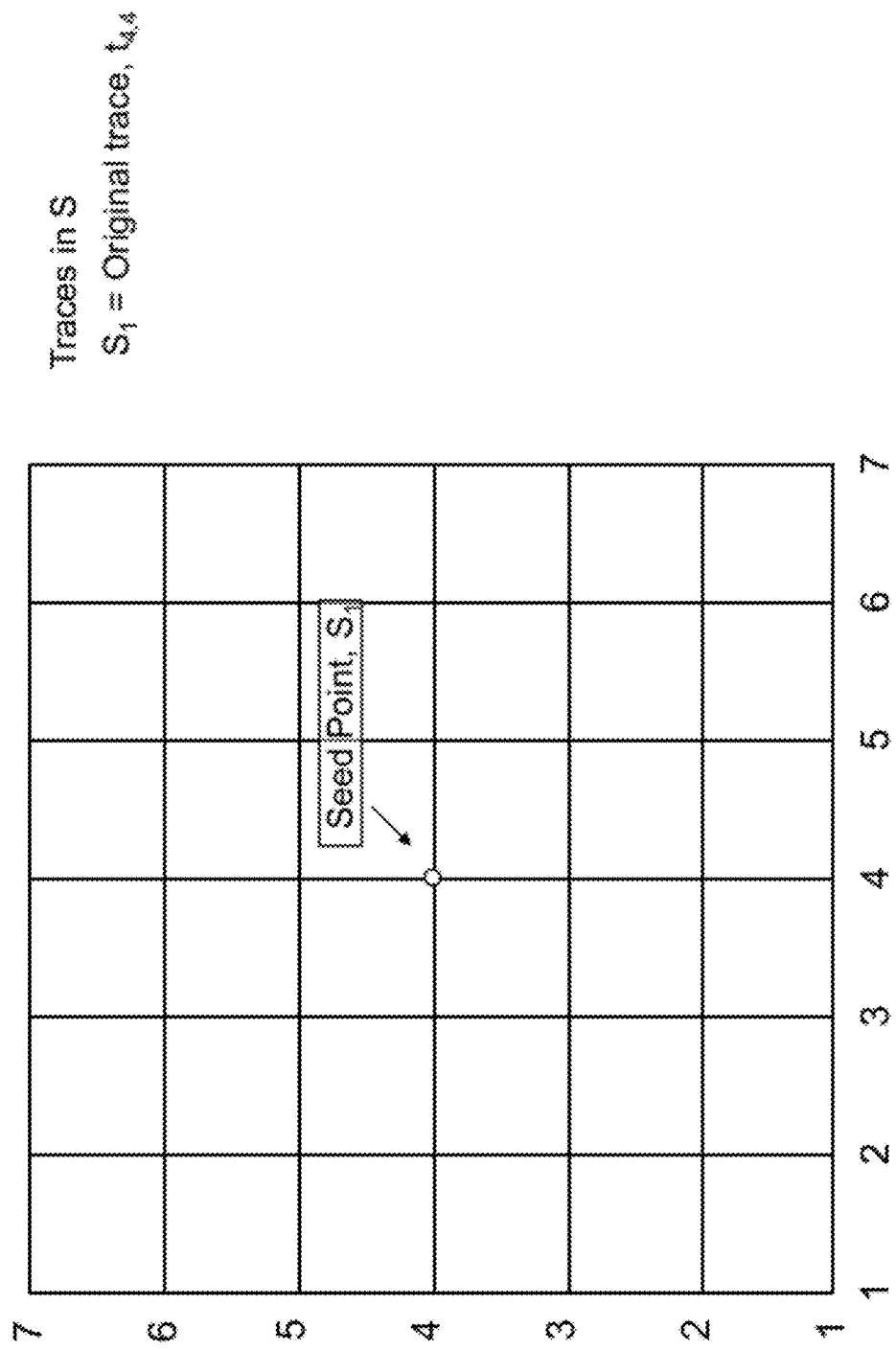

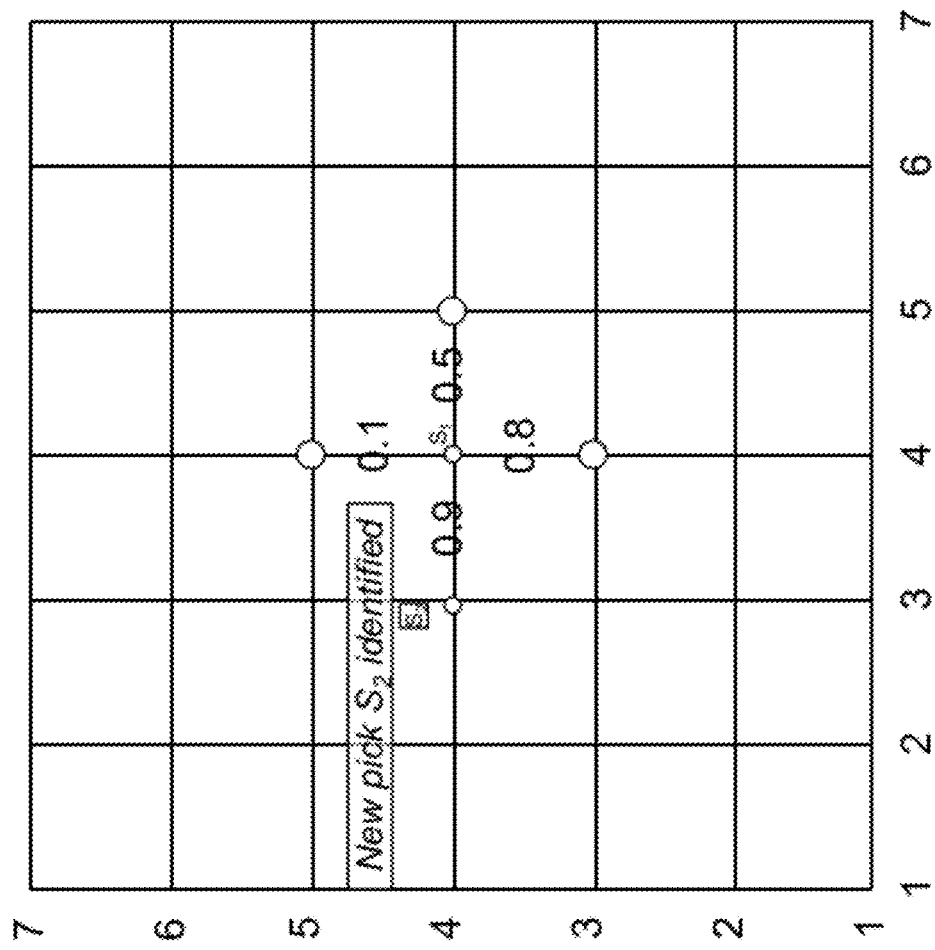

SEISMIC HORIZON AUTOPICKING USING ORIENTATION VECTOR FIELD

CROSS-REFERENCE TO RELATED APPLICATIONS

This application claims the benefit and priority of: (1) provisional application Ser. No. 61/112,725, filed Nov. 8, 2008, entitled "Horizon Autopicking" and 2) provisional application Ser. No. 61/142,169, filed Dec. 31, 2008, entitled "Horizon Autopicking using Minimum Spanning Tree Algorithm"—the contents of both applications being hereby incorporated by reference.

STATEMENT REGARDING FEDERALLY SPONSORED RESEARCH

Not applicable.

REFERENCE TO SEQUENCE LISTING OR A COMPUTER PROGRAM LISTING

None

BACKGROUND OF THE INVENTION

1. Field of Invention

The present invention relates generally to the field of oil and gas exploration and specifically to the interpretation of seismic data for oil and gas exploration. Specifically, this invention provides an improved method for automatically extending interpreter-selected horizons in seismic data.

2. Background Art of the Invention

Seismic interpretation is the science and art of deducing geologic history by delineating geological surfaces as represented in and by seismic data. Sand and mud (which over time harden and become rocks) are naturally deposited in nearly horizontal layers. Boundaries between layers of buried rock are used to reveal subsurface geometry. The boundaries between layers are known as "geologic surfaces", and rocks between boundaries are commonly known as "formations".

As a general definition, "geologic surfaces" are boundaries between rocks when seen at the surface, or as they would be seen if at the surface, or as seen in wells. Although geologic surfaces do not appear in seismic data, they are deduced from seismic "horizons". Horizons are interpreted from seismic features that are aligned approximately horizontally and represent the geological structures in the seismic data.

Some rocks in the subsurface are porous, similar to beach sand. Porous subsurface rocks contain a mixture of water, oil, and/or gas. Oil and gas are lighter than water and tend to separate and float upward. The path of movement and the cessation of movement is in large part dependent on the geometry of the rocks in which the fluids move, and this makes the geometry of interest to seismic interpreters.

Knowledge of rock geometry is also important for understanding the history of the rocks. Layer geometry may reveal the presence of buried river channels or beaches (which are more likely to be porous). If layers are tilted, bent, or broken, the geometry may reveal that rocks moved after they were buried. Seismic data provide a relatively inexpensive way to discover subsurface geometry. Layer history can be important in more sophisticated analyses regarding the generation of oil and gas and the re-distribution of porosity over time.

Geologic "facies" is a key concept in interpretation. A "facies" is a combination of rock type and geologic setting. Sand bars in a river channel are an example of a geologic facies, as are sediments that breach channel boundaries.

As stated above, horizons (not geologic surfaces) are seen in seismic data. Seismic data are acquired by transmitting acoustic signals (generated by dynamite, for example) into the Earth and recording the echoes. Echoes are caused by changes in the acoustic properties of rock from layer to layer, just as echoes in a canyon are caused by the difference in acoustic properties between air and rock. If echoes are laterally consistent, the pattern is understood to reveal a "surface of reflection".

Seismic data are acquired digitally on land, on sea, and on the sea floor. Data are transmitted to processing centers, where noise is filtered out and the data are otherwise conditioned for interpretation. From the processor, seismic data are loaded onto "computer workstations" (a term that includes personal computers as well as more powerful graphic hardware, specialized processors, and general purpose computers) for interpretation.

FIG. 1A depicts a typical record of seismic echoes as detected by a single receiver at the surface. It is a sinusoidal curve as a function of time. Seismic echoes oscillate between compression and rarefaction over a period of several seconds, and this rise and fall in pressure with time is recorded for processing and analysis.

One of the challenges of seismic interpretation is interference between layers. Just as echoes in a canyon can become garbled, a degree of confusion can be mixed with seismic signals. This is the primary reason that horizons cannot be taken at face value as geologic surfaces.

A single recorded echo, as shown in FIG. 1A, is called a "seismic trace." An interpreter may have several thousand or several million traces to interpret. FIG. 1B shows an enhancement of the same trace as shown in FIG. 1A. Where the signal moves to the right above zero (into compression), the line marking the signal has been filled in with black. The configuration of a trace reflecting to the right and then returning toward zero, as highlighted in black, is called a "peak" in the trace. Excursion to the left with a return to zero is called a "trough".

To detect geometric relationships, echoes must be collected along a line or over an area, and seismic receivers are typically laid out along a line or in a grid pattern over the surface of the Earth. Each receiver, in effect, affords a "peephole" into the subsurface, and geometry is detected by examining data from many such adjacent peepholes.

Even when collected in grids, seismic data are typically displayed as single lines for interpretation. These vertical cross sections, present a line of collected data or one line in a grid of collected data. A line display provides a profile view of the seismic echoes so that one can readily see differences in the echoes vertically and laterally and along the line.

FIG. 2A depicts a typical seismic line as a collection of contiguous traces, each trace as shown in FIG. 1A. FIG. 2B shows the same seismic line as typically displayed for interpretation, using the display technique of FIG. 1B for each trace. Traces are typically 50 to 150 feet apart.

One aspect of interpretation is the mechanical marking of surfaces deemed important by the interpreter. Marking these surfaces is done by interpreters on computer workstations when they electronically "draw" lines on a seismic section as displayed by a workstation. Each drawn line represents an interpreted horizon at that location. An interpretation project will typically generate several dozen and sometimes hundreds of horizons. If the seismic data were collected on a grid, each horizon is likely to be found on numerous sections.

Horizons may be displayed in color so that they can be distinguished from one another and from the seismic data itself. FIG. 2C is the same as FIG. 2B with the addition of a typical interpreted horizon, as indicated by the arrow. In this interpretation, the interpreter has followed seismic peaks across the section.

To alleviate the tedium of picking dozens of horizons over hundreds of seismic sections, most interpretation software applications provide "autopickers" or "autotrackers" that compute picks automatically based on a starting set of picks. As a result, only a small percent of the total picks are picked manually.

In general, autopickers proceed in a calculated direction from one picked location to the next. Typically, the direction is horizontally from the starting trace to surrounding unpicked traces. Possible picks on surrounding traces are scored, and either the one or several with the best score(s) is/are retained as picks.

U.S. Pat. No. 5,056,066 (Howard, 1991) describes the typical process of autopicking, whereby picks are selected laterally from trace to trace, starting with the seed pick. Most autopickers start with this conceptual and mechanical framework. Differences between methods are in the particular way picks are selected. U.S. Pat. No. 5,056,066 compares several traces in the area with the goal of obtaining a more reliable pick.

U.S. Pat. No. 5,153,858 (Hildebrand, 1992) and U.S. Pat. No. 5,251,184 (Hildebrand et al, 1993) address the speed and efficiency of picking, while U.S. Pat. No. 5,537,365 (Sitoh, 1996) scores the sufficiency of the picking parameters. Finally, U.S. Pat. No. 6,016,287 (Klebba and van Bemmel, 2000) provides a method for relocating manual picks to depths where they would have been picked automatically.

SUMMARY OF THE INVENTION

The present invention provides a unique method for providing direction to an autopicker. In the prior art, autopickers typically proceed horizontally from picked locations to adjacent traces. Samples in adjacent traces are compared with samples in the same interval in the picked trace and scored for acceptability. The present invention discloses a picking method that proceeds at an angle, usually not horizontal, as determined by an Orientation Vector Field ("OVF"). OVF is a set of orientation vectors representing the most salient local direction of an image pattern. Traces picked using the OVF are more consistent with interpreter expectation.

Using a computer workstation, the OVF is computed by convolving an optical filter with the seismic section. That is, the seismic section is treated as a two-dimensional ("2D") image, with each sample in a trace being a pixel. A section with 250 traces and 1300 samples per trace would comprise an image of 325,000 pixels. Each pixel is represented by a number that indicates the "darkness" of the image at that point.

As used in this application, an "optical filter" refers to a convolution operator, or matrix of numbers, that is convolved with the pixels in the seismic image. The present invention discloses a method of applying several operators, each oriented in a different direction, to detect which direction is most salient in a local image texture pattern. This procedure is well known in the field of vision science, and, for example, is described in "Texture Discrimination by Gabor Functions" by Mark R. Turner (1986) in the journal Biological Cybernetics Springer-Verlag. FIG. 3 illustrates a "bank" of Gabor operators, each at a different scale or orientation.

The Gabor and Log-Gabor filters are the preferred filters in the vision science community. These are not the only filters that could be used for this purpose. In the preferred embodiment of the present invention, a modification of the Log-Gabor filter is used.

Optical filters have been applied by others to seismic data for the purpose of classifying the appearance of the data. See, for example, U.S. Pat. No. 6,438,493 (West and May, 2002). To the extent possible, each pattern is equated with a facies or rock type. This allows the interpreter to convert a texture cross section into a geologic cross section. The prior art uses of optical filters are different and distinguishable from the present invention, which applies optical filters to determine the intrinsic orientation of the data and to reduce it to a vector field.

Other objects and technical advantages of the invention are readily apparent to one skilled in the art from the following figures, descriptions, and claims.

BRIEF DESCRIPTION OF THE DRAWINGS

FIG. 6A shows the first step in a series illustrating a picking process in accordance with one embodiment of the present invention.

FIG. 6C shows the third step in a series illustrating the picking process.

FIG. 6I shows the ninth step in a series illustrating the picking process.

DETAILED DESCRIPTION OF THE INVENTION

While the present invention will be described more fully hereinafter with reference to the accompanying drawings, in which a preferred embodiment of the present invention is shown, it should be understood that persons of skill in the appropriated arts may modify the invention here described while still achieving the favorable results of this invention. Accordingly, the following description is to be understood as being broad, teaching disclosure directed to persons of skill in the appropriate arts, and not limiting upon the present invention.

Figure 1A:
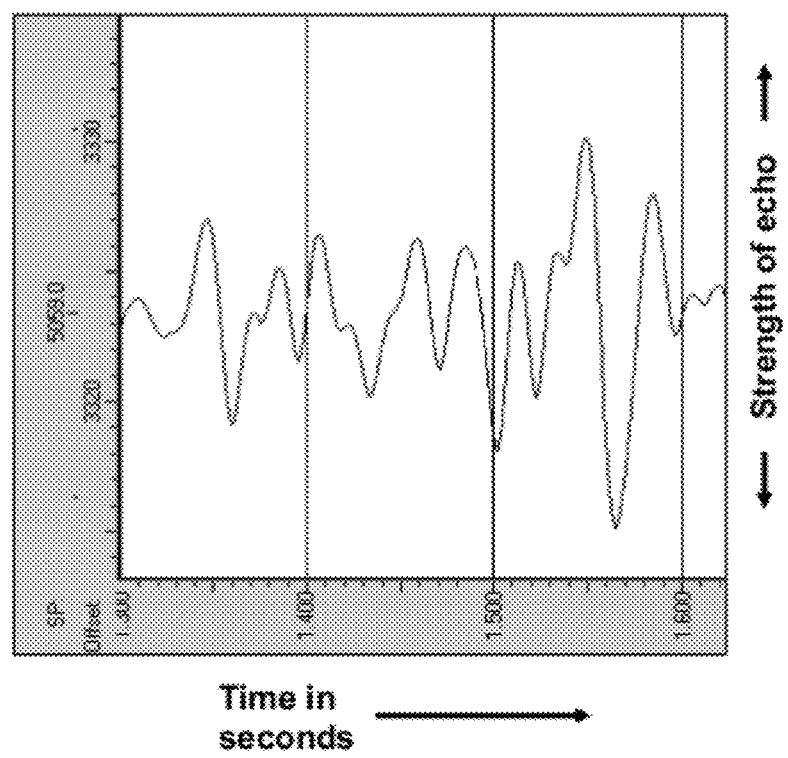
FIG. 1A shows a typical seismic echo, wherein the strength of echo (loudness) is recorded as a function of time.
Figure 1B:
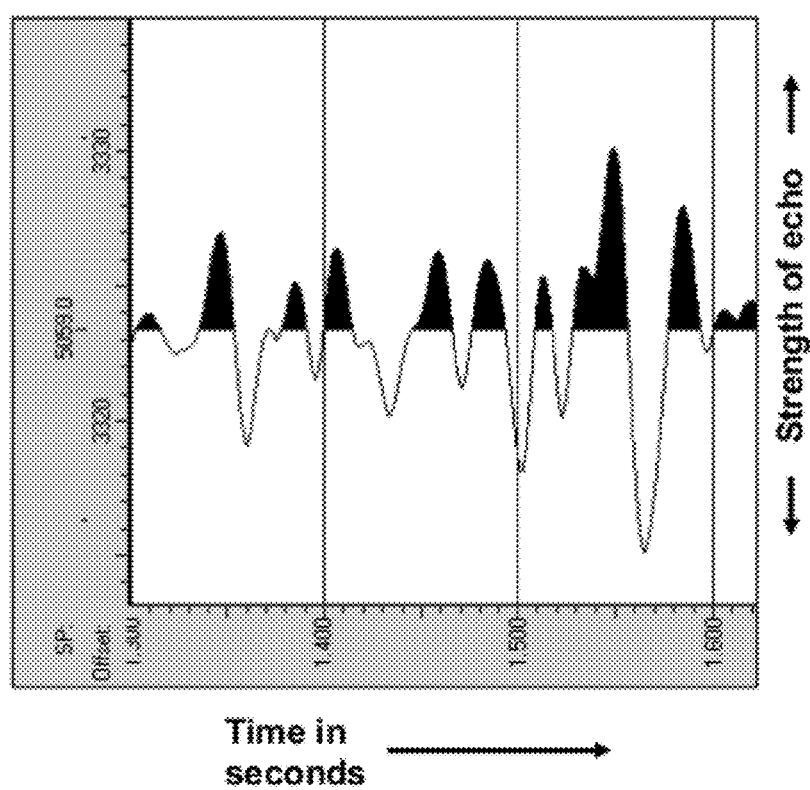
FIG. 1B depicts the seismic echo of FIG. 1A with positive (compressional) phase of echo highlighted in black.
Figure 2A:
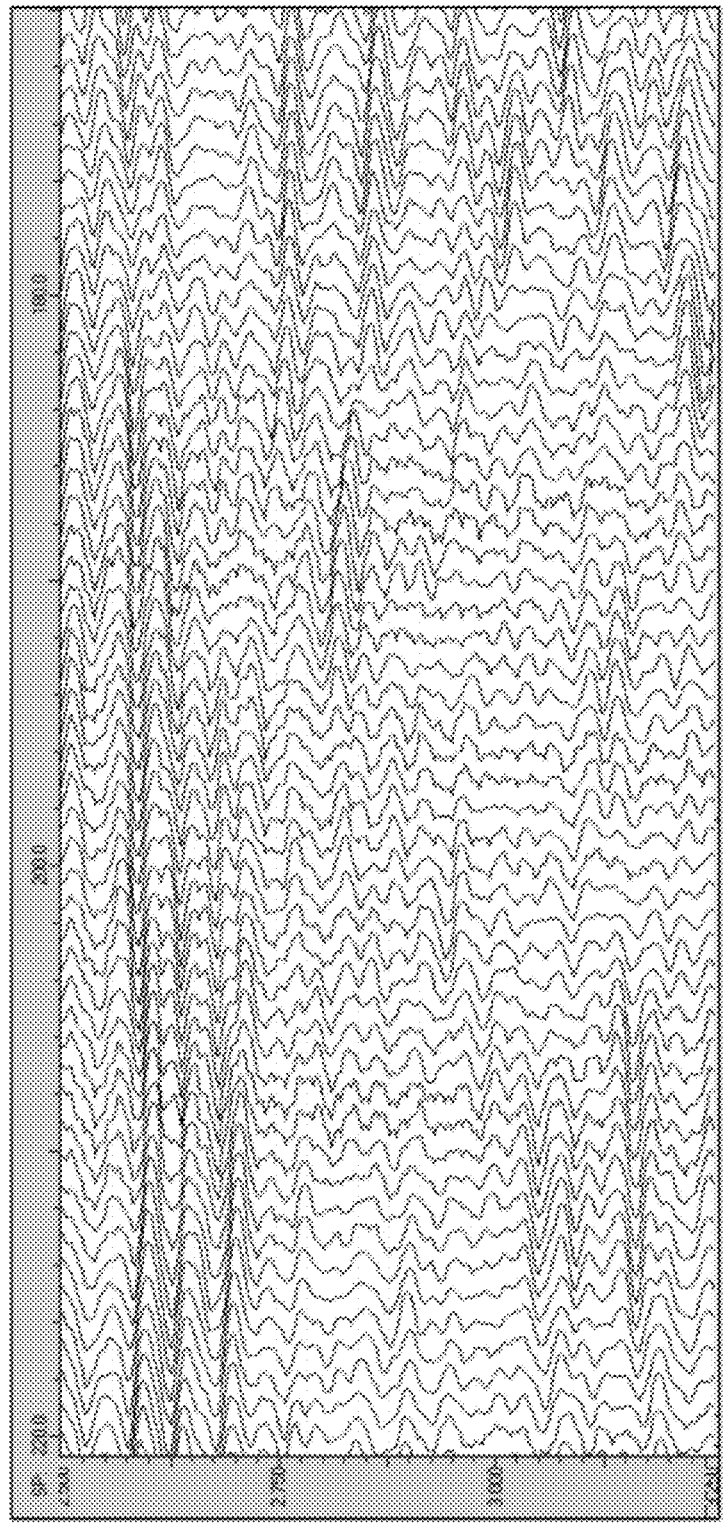
FIG. 2A is a typical seismic section comprising a collection of adjacent traces.
Figure 2B:
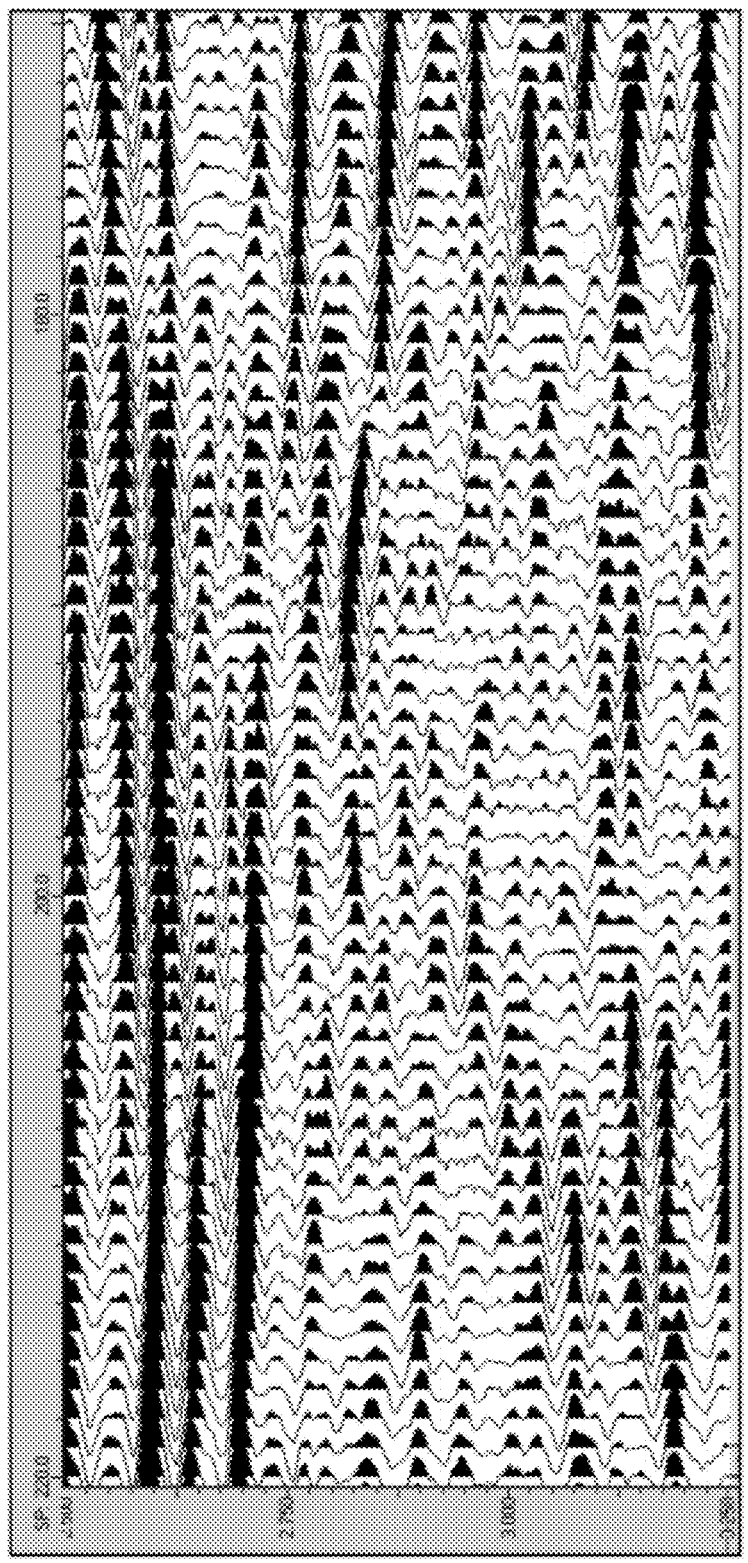
FIG. 2B shows the seismic section of FIG. 2A with traces highlighted.
Figure 2C:
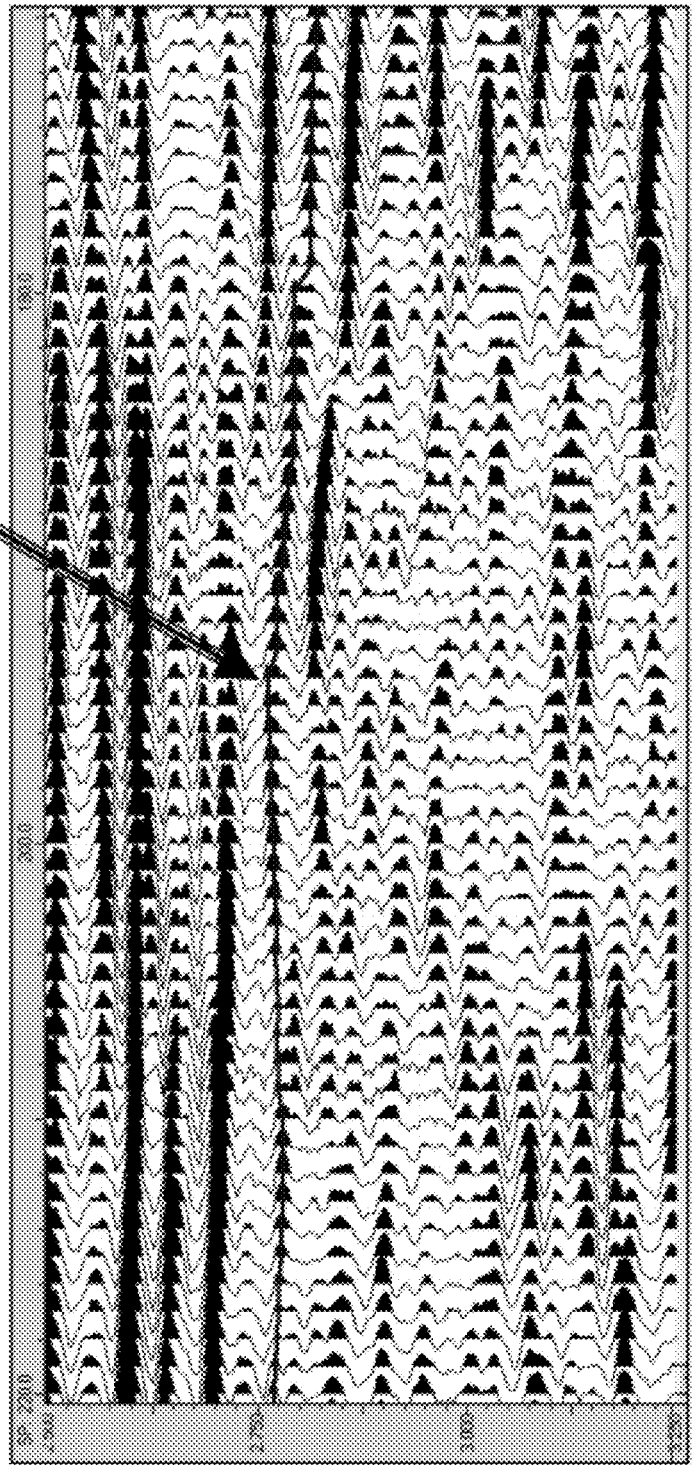
FIG. 2C shows the seismic section of FIG. 2B with horizon interpretation added.
Figure 3:
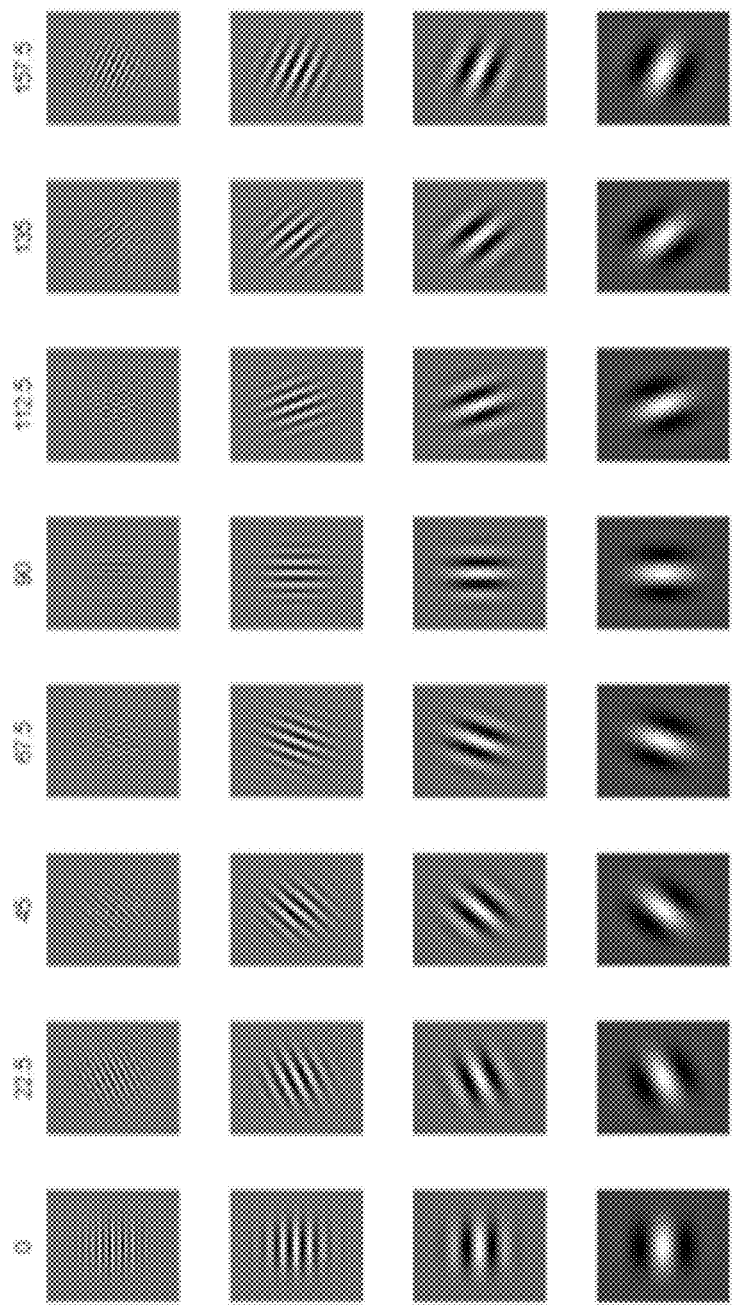
FIG. 3 illustrates a bank of Gabor filters in multi-scales and with various center orientations.

In the present invention, the OVF is calculated using a computer workstation by convolving a pre-determined bank of optical filters, preferably modified Log-Gabor filters, with the seismic section. The bank of optical filters is designed in the frequency domain, and the seismic section is transformed to the frequency domain with a 2D Fourier transform. As shown in FIG. 3, the standard bank of optical filters has different scales of filters oriented in different directions. Different scales accommodate different frequencies of seismic data.

The dominant direction in the image is found by (1) summing the convolution energy at different scales (frequencies) so that different frequencies are taken into account, and (2) selecting the direction that shows the greatest average convolution energy for further calculations.

The present invention differs from the field of vision science by modifying the Log-Gabor filter. Instead of having filters at different scales, a step function in the radial direction is used. This is done because averaging many filters with different scales converges to a step function. Only the angular component of the Log-Gabor filters is needed. Since filters at different scales are not used, the number of filters in the bank is reduced by the factor of the number of scales.

Even with the reduced size of the filter bank, calculation of the OVF requires a significant amount of time. For this reason, in accordance with the preferred embodiment of the present invention, the computation is performed in a separate step, independent of horizon picking. It is then available for picking any horizon on its associated seismic data. The initial time to create the OVF is small compared with the time required to pick the hundreds of horizons that are typically required in an interpretation project. There is no need to recalculate the OVF for each horizon.

Figure 4:
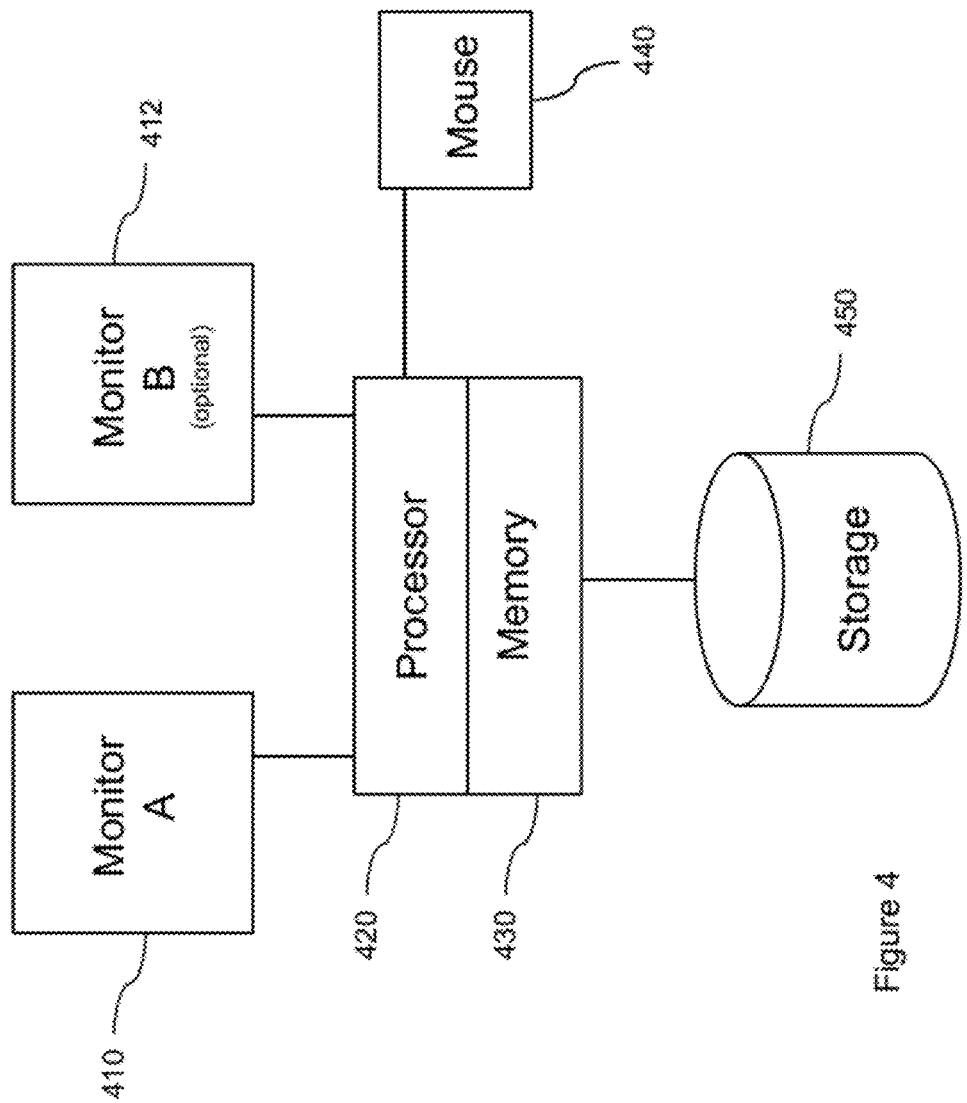
FIG. 4 shows a typical computer workstation for performing the method of the present invention.

FIG. 4 shows an example computer workstation for performing the methods of the present invention. A monitor 410 is used to display the seismic data and horizon. An optional second monitor 412 may be used to assist the process. A processor 420 and memory 430 are used for performing OVF calculations, automatic horizon picking, and displaying the picked horizon. A pointing device 440 (such as a mouse) is used to select initial seed points on the horizon. Data storage 450 is used to store the seismic data and the result picks. An example computer workstation may have the following system configuration: Intel Core2 Quad processor running at 2.83 GHz; Windows Vista (64-bits) operation system; system memory of 8 Gigabytes; system storage of 500 Gigabytes; and two LCD monitors.

Perform OVF Calculations

Figure 5:
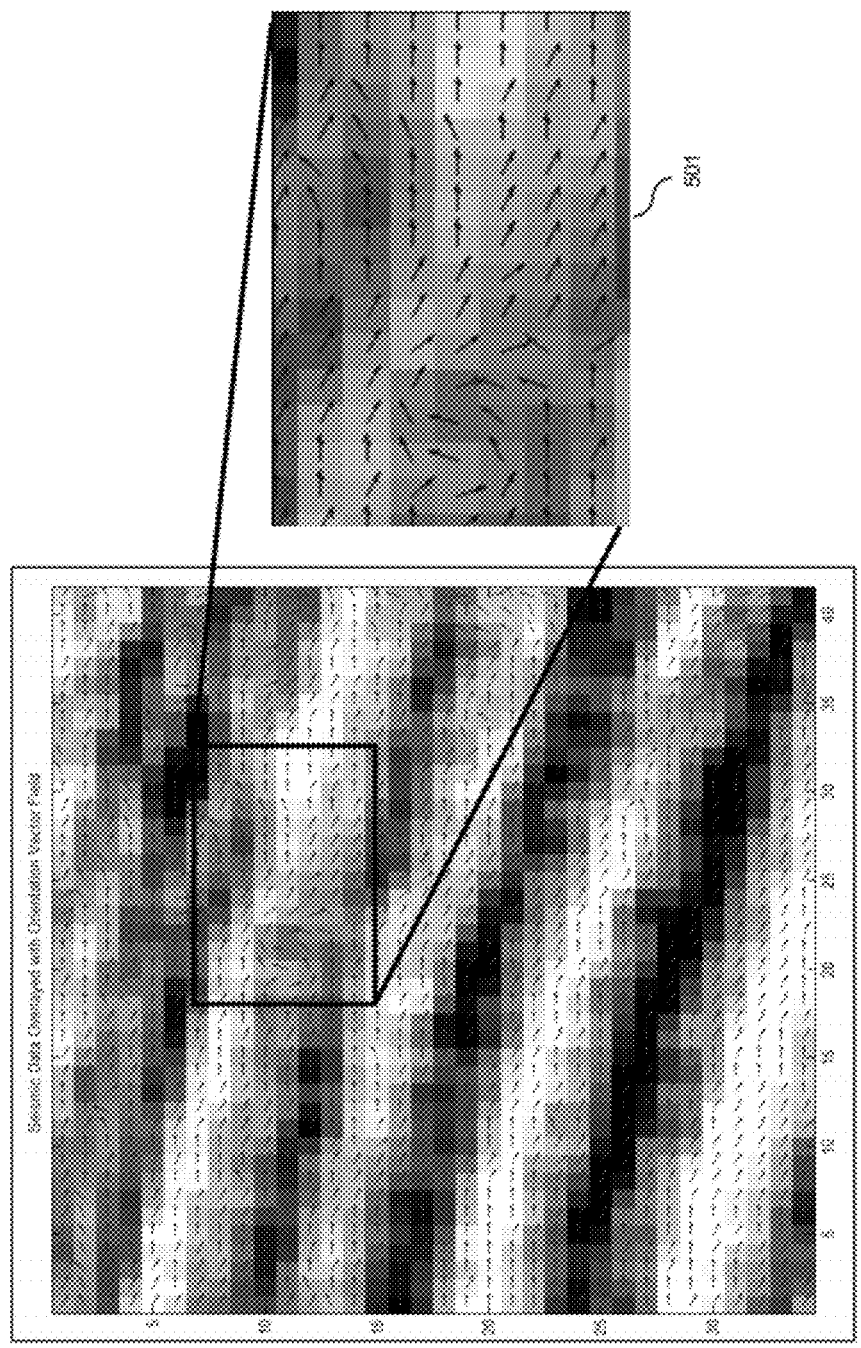
FIG. 5 shows a seismic section with OVF overlaid on the seismic data.

FIG. 5 shows a seismic section having a window 501 showing the OVF data (in the form of arrows showing the orientations) displayed over the seismic data on which it was calculated. The OVF was calculated using the following method:

Step 1: Convert the 2D seismic slice I into frequency domain Î by 2D Fourier transform.

Step 2: Construct an array of optical filters in frequency domain with various center orientation $\theta_i$:

$$H_i(\theta) = e^{\frac{-(\theta-\theta_i)^2}{2\sigma_\theta^2}},$$

where $H_i$ is the $i^{th}$ filter, $\theta$ the orientation variable in 2D frequency domain, $\theta_i$ the center orientation of filter i, and $\sigma_\theta$ the angular bandwidth of the filter.

Step 3: Convolve Î with every filter $H_i$, save the filter response $\hat{R}_i$.

Step 4: Apply inverse Fourier transform on $\hat{R}_i$, save the spatial domain results in $R_i$.

Step 5: For each pixel I(x,y), let j be the index of the filter which gives the maximum response, i.e., $j=\text{argmax}_i [|R_i(x,y)|]$. Because the $R_i$ contains both real part and imaginary part, a norm operator is applied. As a result, the orientation for the pixel I(x,y) is $\theta_j$. Both of these values define the orientation vector as $<|R_i(x,y)|, \theta_j>$ for pixel I(x,y), and the OVF is the collection of the orientation vectors of I.

Calculation of the OVF produces an angle and a convolution energy for each sample in the seismic section, one pair of numbers for inline sections and one pair of numbers for crossline sections, for a total of four numbers for each sample in the volume. Only the direction with the maximum energy is retained, leaving two angles, two numbers, for each sample.

Picking Horizons Using OVF

Once the OVF is calculated, it can be used during the horizon picking process by following the orientation vectors of the samples. The autopicking algorithm requires for some initial points to be selected on the horizon prior to the autopicking start. These initial points are called seeds. At least one seed point per horizon is required for the algorithm to start.

Given the initial seeds, the autopicking algorithm needs to make a decision on the preferred picking direction. This is done by computing the Confidence, $C_{s,j}$, between each seed trace and the candidate traces surrounding the seed traces (subscript s is the trace number of a trace containing a seed and j is the number of an adjacent trace that does not have a pick). Confidence is based on two quantities: the "Affinity" between traces and the difference in time or depth between the seed pick and the candidate picks.

The pick at each seed trace, s, is projected in the OVF calculated direction to an adjacent, unpicked trace, which is a candidate trace, $c_j$. The point where the projection intersects $c_j$ becomes a candidate location for the next pick. The seismic event of interest (peak, trough, zero-crossing) nearest the intersection is selected as a candidate event of interest. The sample nearest in time to this event is a candidate sample of interest. Each pick has two states: candidate pick and confirmed pick, and the horizon contains only confirmed picks.

After the candidate sample is picked, one then computes the Affinity, A. "Affinity" is the zero-lag cross-correlation divided by the larger of $s_{auto}$ and $c_{j,auto}$, where $s_{auto}$ is the zero-lag autocorrelation of s and $c_{j,auto}$ is the zero-lag autocorrelation of candidate j. Autocorrelation is calculated over a pre-determined number of samples, 2k+1. Let m be the sample number of the seed sample in trace s, then $$A_j = \frac{\sum_{i=m-k}^{m+k} s_i c_{j,i}}{\text{Max}(s_{auto}, c_{j,auto})}$$

$$s_{auto} = \sum_{i=m-k,m+k}^{n} s_i^2, \quad c_{j,auto} = \sum_{i=m-k,m+k}^{n} c_{j,i}^2$$

Note that the larger the difference between $s_{auto}$ and $c_{j,auto}$, the smaller the value of $A_j$: the more similar the amplitudes between the traces, the greater their "Affinity".

The second number contributing to $C_{s,j}$, requires calculation of the lagged cross-correlation between the seed trace and each $c_j$. Let $L_j$ be lag that gives the maximum for candidate j and $L_{max}$ be the lag that gives the maximum correlation for all candidates. The Confidence value for trace j is $$C_{s,j} = A_j \exp\{-\delta(L_j + L_{max})\},$$

where $\delta$ is a constant controlling the sensitivity to the lag values.

The seed and candidate with the largest value of $C_{s,j}$ selects trace s as the trace with the seed pick and candidate $c_j$ as the next pick. Once picking begins, a sequence of seed picks develops. For picking purposes $c_j$ is shifted vertically so that the event sample in $c_j$ is at the same time (or depth) as the event sample in the seed trace, then $c_j$ is replaced by an average between the seed and $c_j$ according to this equation $$S_t = \eta c_j + (1-\eta) S_T$$

where t is the seed number, and T is the number of the parent seed, that is, the seed value in this sequence with the largest value of C (usually t−1). The s indicates any trace with a seed pick whereas S indicates a seed trace selected in this particular sequence of autopicking $S_1$ is the trace with the seed that is used to start the autopicking Candidate traces are not shifted in the data seen by the interpreter; they are shifted only for the purpose of generating the sequence $S_t$, which is a smoothed version of the original data.

All subsequent picks are found from seeds already in the sequence. The sequence number, t, is recorded as the "pick order". "Pick order" is an attribute of the horizon that can be displayed in the same way amplitude map, for example, can be displayed. When no more picks can be made from the sequence, another seed is selected and a new sequence begins.

Example Picking Process

Figure 6B:
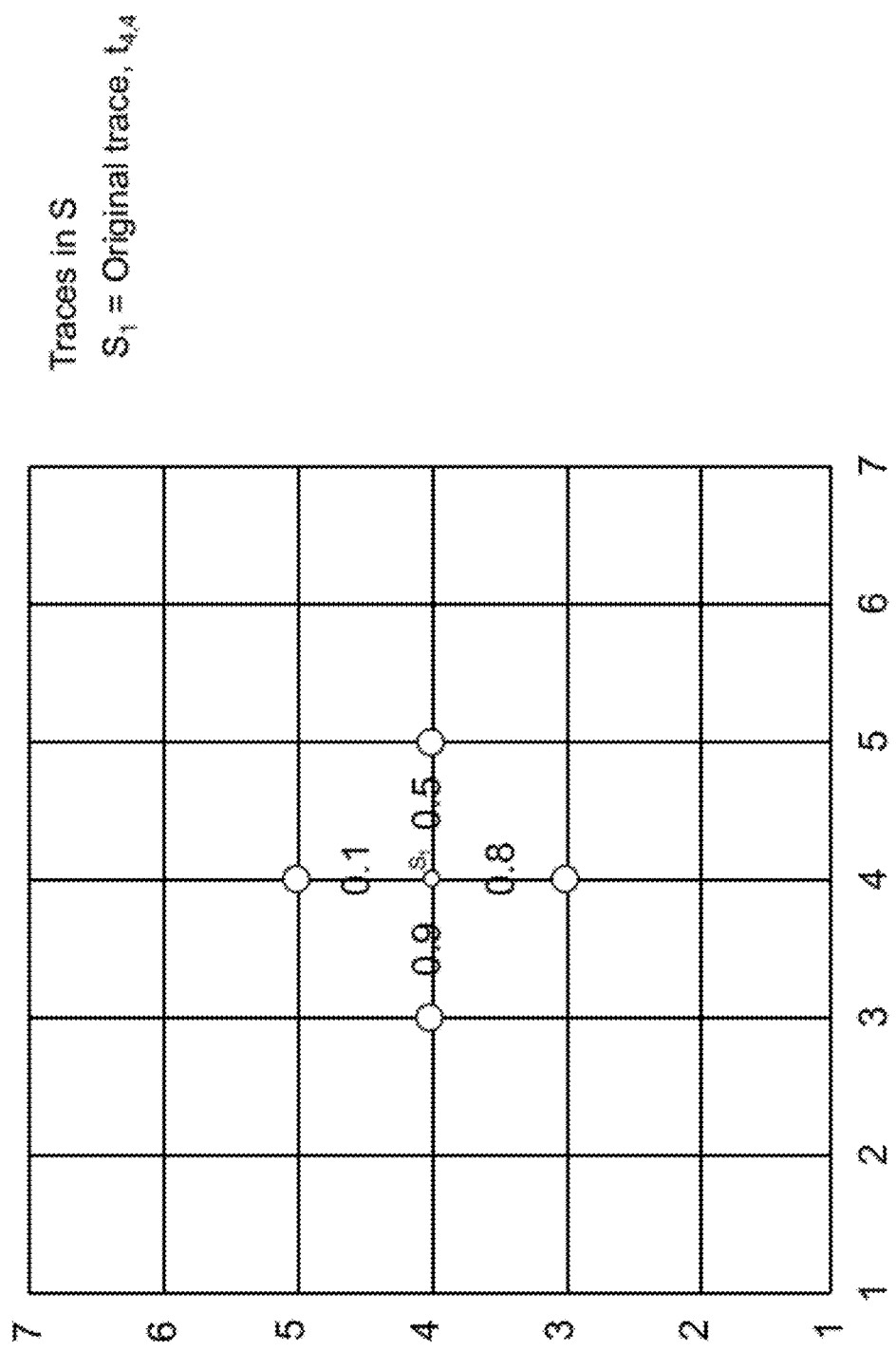
FIG. 6B shows the second step in a series illustrating the picking process.

FIG. 6A through FIG. 6I illustrate an example of the picking process performed in accordance with the present invention. FIG. 6A: an initial pick (i.e., seed point) of S1 is shown as Trace (4,4) on a grid. FIG. 6B: in step 1, neighboring traces are tested for candidate picks. The four candidate picks from the neighboring traces have confidence values computed relative to S1. Candidate pick of Trace (5,4) has a confidence value of 0.5; candidate pick of Trace (4,5) has a confidence value of 0.1; candidate pick of Trace (3,4) has a confidence value of 0.9; and candidate pick of Trace (4,3) has a confidence value of 0.8. FIG. 6C: in step 2, the candidate pick of Trace (3,4) having the highest confidence value (0.9) is identified as a confirmed pick S2.

Figure 6D:
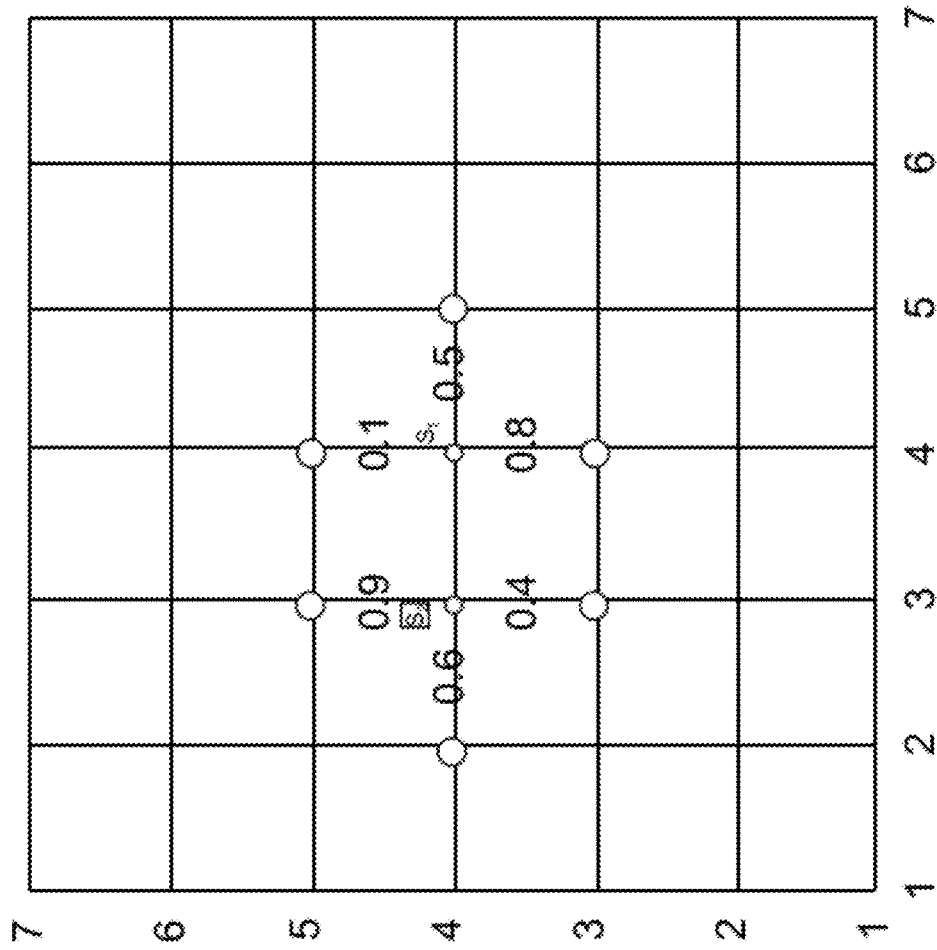
FIG. 6D shows the fourth step in a series illustrating the picking process.
Figure 6E:
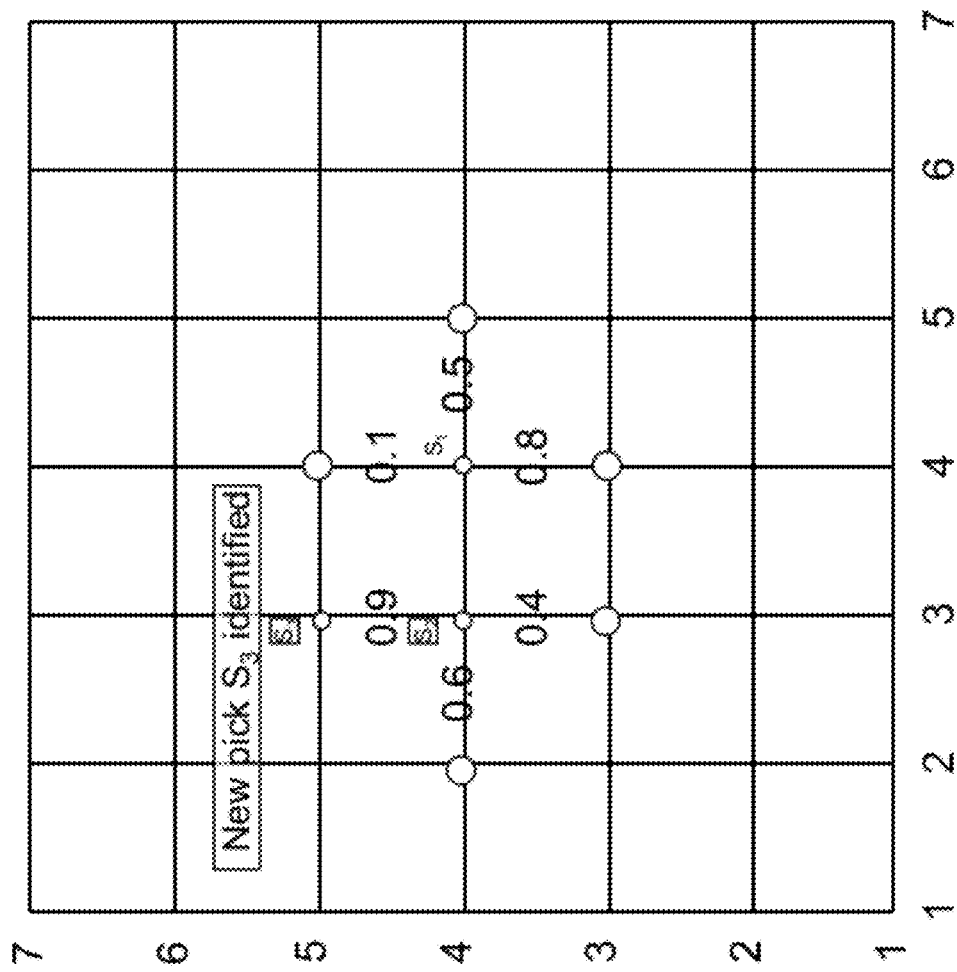
FIG. 6E shows the fifth step in a series illustrating the picking process.

FIG. 6D: in step 3, to assess the next set of candidate picks, neighbor traces are tested relative to S1 and S2. Candidate pick of Trace (5,4) relative to S1 has a confidence value of 0.5; candidate pick of Trace (4,5) relative to S1 has a confidence value of 0.1; candidate pick of Trace (3,5) relative to S2 has a confidence value of 0.9; candidate pick of Trace (2,4) relative to S2 has a confidence value of 0.6; candidate pick of Trace (3,3) relative to S2 has a confidence value of 0.4; and candidate pick of Trace (4,3) relative to S1 has a confidence value of 0.8. FIG. 6E: in step 4, the candidate pick of Trace (3,5), having the highest confidence value of 0.9, is identified as confirmed pick S3.

Figure 6F:
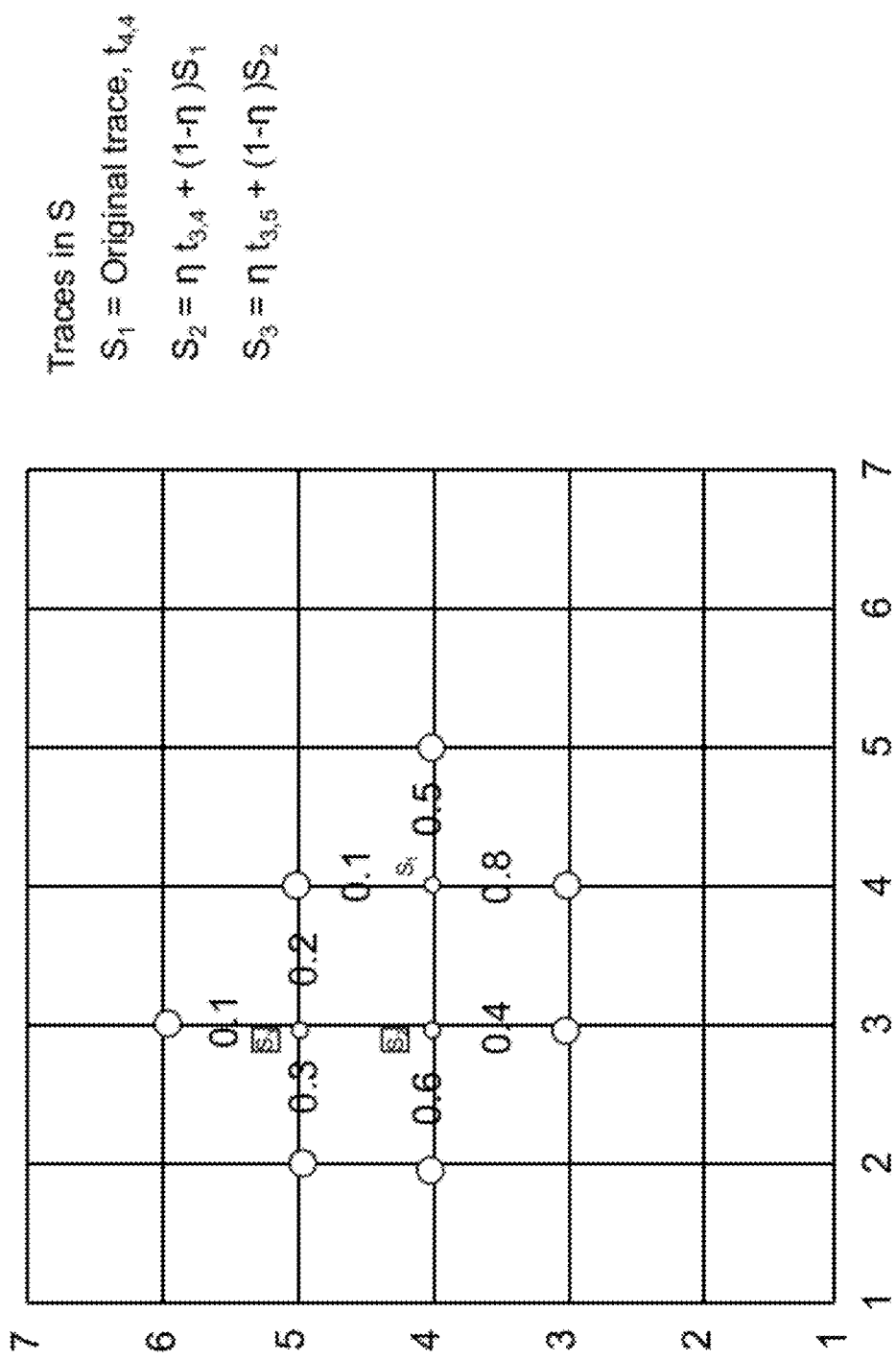
FIG. 6F shows the sixth step in a series illustrating the picking process.
Figure 6G:
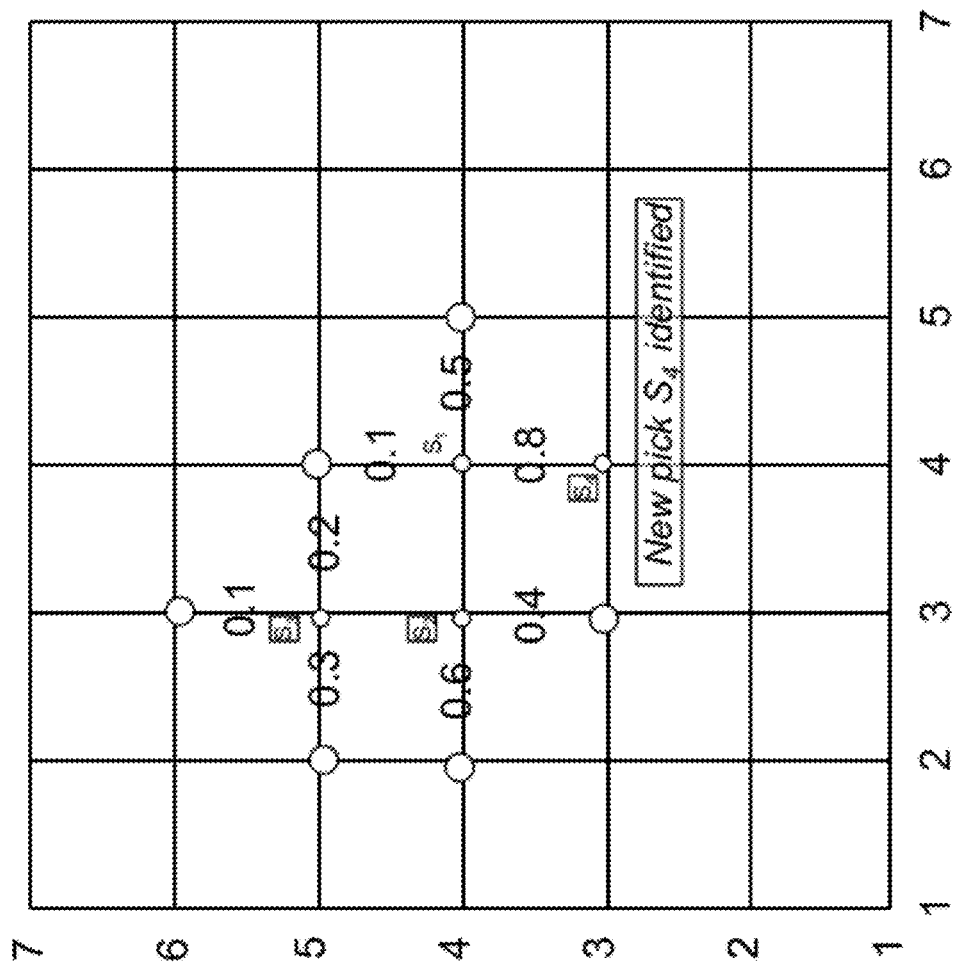
FIG. 6G shows the seventh step in a series illustrating the picking process.

FIG. 6F: in step 5, again perform test of neighboring traces relative to S1, S2, and S3 to determine candidate picks. Candidate picks of the following traces are determined: Trace (5,4) relative to S1 has a confidence value of 0.5; Trace (4,5) relative to S1 has a confidence value of 0.1; Trace (4,5) relative to S3 has a confidence value of 0.2; Trace (3,6) relative to S3 has a confidence value of 0.1; Trace (2,5) relative to S3 has a confidence value of 0.3; Trace (2,4) relative to S2 has a confidence value of 0.6; Trace (3,3) relative to S2 has a confidence value of 0.4; and Trace (4,3) relative to S1 has a confidence value of 0.8. FIG. 6G: in step 6, the candidate pick of Trace (4, 3), having the highest confidence value of 0.8, is identified as confirmed pick S4.

Figure 6H:
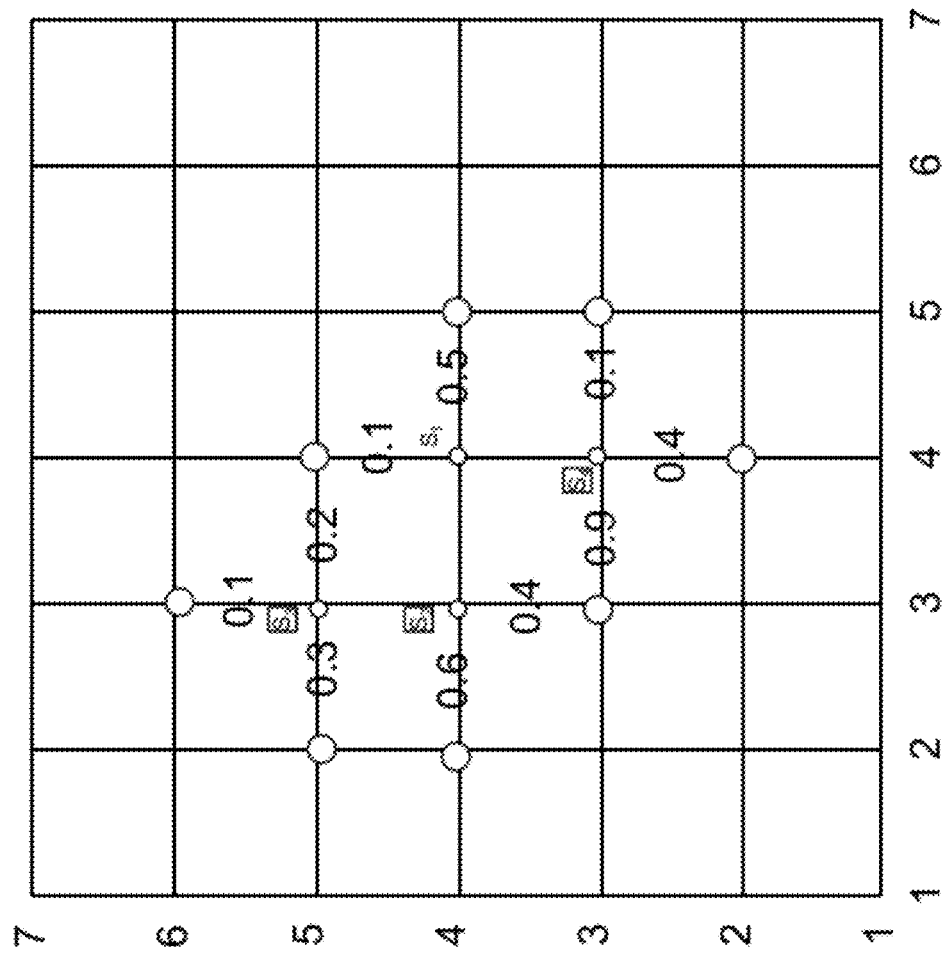
FIG. 6H shows the eighth step in a series illustrating the picking process.
Figure 61:
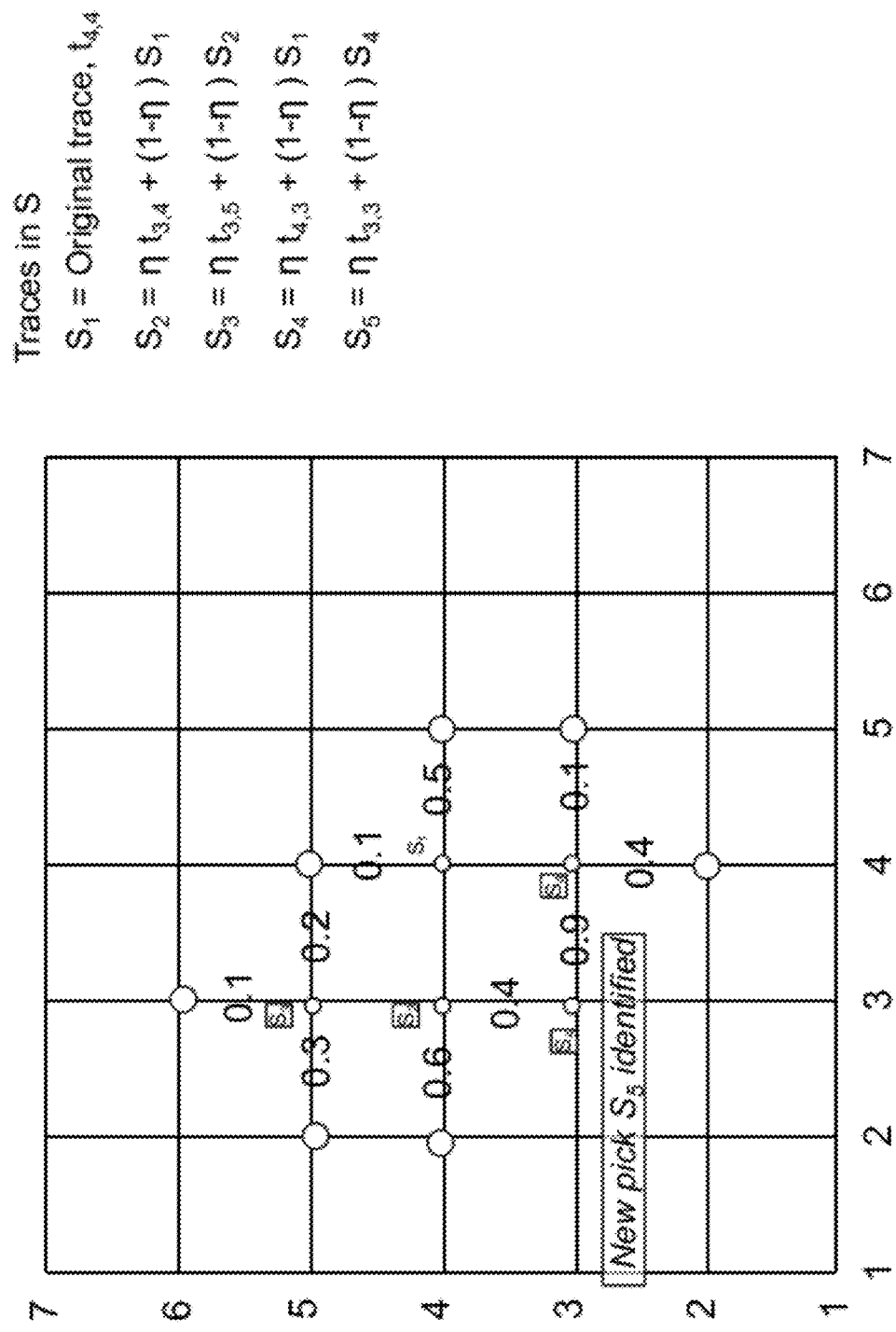

FIG. 6H: in step 7, again test neighboring traces as candidate traces relative to S1 through S4. Candidate picks of the following traces are determined: Trace (5,4) relative to S1 has a confidence value of 0.5; Trace (4,5) relative to S1 has a confidence value of 0.1 and relative to S3 has a confidence value of 0.2; Trace (3,6) relative to S3 has a confidence value of 0.1; Trace (2,5) relative to S3 has a confidence value of 0.3; Trace (2,4) relative to S2 has a confidence value of 0.6; Trace (3,3) relative to S2 has a confidence value of 0.4 and relative to S4 has a confidence value of 0.9; Trace (4,2) relative to S4 has a confidence value of 0.4; and Trace (5,3) relative to S4 has a confidence value of 0.1. FIG. 6I: in step 8, the candidate pick of Trace (3, 3), having the highest confidence value of 0.9, is identified as confirmed pick S5.

In this example, the picking process stops with step 8, but picking process in general may be shorter or, more likely, longer, with test and identify repeated until stopping criteria are met and there are no candidate traces remaining.

In accordance with one embodiment, picking ceases when certain user specified criteria are met. For instance, in our implementation, user can set the stopping conditions based on:
 a. search window size;
 b. confidence value;
 c. the vertical difference between any existing neighboring picks and candidate pick;
 d. the amplitude of the found seismic event;
 e. other surfaces intersecting the horizon being picked; or
 f. cross-correlation value.

Where picking ceases, the reason for stopping is recorded as an attribute of the horizon, and the reason can be displayed in the same way the amplitude map, for example, can be displayed.

The foregoing description of illustrated embodiments of the present invention, including what is described in the Abstract and the claims, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention. Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for determining a horizon in a two-dimensional seismic section from an initial pick point on the horizon, the seismic section comprising a plurality of samples, wherein each sample is referenced using the variable x and y as the coordinates of the sample in the seismic section, the method comprising:
    convolving a set of optical filters with the seismic section to obtain a set of responses, wherein, for each sample, there are corresponding response values associated with the x and y coordinates of the sample, the optical filters having various center orientation values;
    determining an orientation vector for each sample based on the response value associated with the x and y coordinates of the sample;
    creating an orientation vector field comprising the orientation vectors of all the samples and storing the orientation vector field; and
    using a computer processor to determine the horizon by following the orientation vectors of the samples in the orientation vector field, beginning with the initial pick point on the horizon.

2. The method of claim 1, wherein the optical filters are modified Log-Gabor filters.

3. The method of claim 1, wherein the orientation vector for each sample is determined based on the maximum response value associated with the x and y coordinates of the sample.

4. The method of claim 1, wherein determining an orientation vector comprises:
    comparing response values associated with the x and y coordinates of the sample for different optical filters of the set of optical filters;
    determining a maximum response value;
    selecting the optical filter corresponding to the maximum response value; and
    setting the orientation vector of the respective sample as the center orientation value of the selected filter.

5. The method of claim 1, wherein the orientation vectors are determined by:
    comparing response values associated with each sample for different optical filters of the set of optical filters;
    determining a maximum response value for each sample;
    selecting the optical filter corresponding to the maximum response value; and
    setting the orientation vector of the respective sample as the center orientation value of the selected filter.

6. The method of claim 1, wherein the set of optical filters comprises a set of matrices of numbers.

7. The method of claim 1, wherein convolving comprises:
    converting the seismic section from a spatial domain to a frequency domain using a Fourier transform;
    convolving the set of optical filters with the converted seismic section in the frequency domain; and
    converting response values from the convolving from the frequency domain to the spatial domain using an inverse Fourier transform.

8. The method of claim 1, wherein convolving comprises obtaining an angle and a convolution energy as a response for each filter and sample combination of the seismic section and wherein determining comprises selecting the filter corresponding to the highest convolution energy.

9. The method of claim 1, wherein determining comprises selecting, for each sample, the optical filter corresponding to the maximum response value and setting the center orientation value of the selected filter as the orientation of the orientation vector for the respective x and y coordinate.

10. The method of claim 2, wherein the modified Log-Gabor filters are modified by replacing filters at different scales by a radial direction step function.

11. A non-transitory computer-readable medium having instructions stored thereon that, when operated on by the computer, cause the computer to perform operations comprising:
    convolving a set of optical filters with a seismic section to obtain a set of responses, the seismic section comprising a plurality of samples, wherein each sample is referenced using the variable x and y as the coordinates of the sample in the seismic section, wherein, for each sample, there are corresponding response values associated with the x and y coordinates of the sample, the optical filters having various center orientation values;
    determining an orientation vector for each sample based on the response value associated with the x and y coordinates of the sample;
    creating an orientation vector field comprising the orientation vectors of all the samples and storing the orientation vector field; and
    using the orientation vector field to determine a horizon in the two-dimensional seismic section by following the orientation vectors of the samples, beginning with the initial pick point on the horizon.

12. The medium of claim 11, wherein the optical filters are modified Log-Gabor filters.

13. The medium of claim 11, wherein the orientation vector for each sample is determined based on the maximum response value associated with the sample.

14. The medium of claim 11, wherein the orientation vectors are determined by:
    comparing response values associated with each sample for different optical filters of the set of optical filters;
    determining a maximum response value for each sample;
    selecting the optical filter corresponding to the maximum response value; and setting the orientation vector of the respective sample as the center orientation value of the selected filter.

15. The medium of claim 11, wherein convolving comprises:
    converting the seismic section from a spatial domain to a frequency domain using a Fourier transform;
    convolving the set of optical filters with the converted seismic section in the frequency domain; and
    converting response values from the convolving from the frequency domain to the spatial domain using an inverse Fourier transform.

16. The medium of claim 11, wherein convolving comprises obtaining an angle and a convolution energy as a response for each filter and sample combination of the seismic section and wherein determining comprises selecting the filter corresponding to the highest convolution energy.

17. The medium of claim 11, wherein determining comprises selecting, for each sample, the optical filter corresponding to the maximum response value and setting the center orientation value of the selected filter as the orientation of the orientation vector for the respective x and y coordinate.

18. The medium of claim 12, wherein the modified Log-Gabor filters are modified by replacing filters at different scales by a radial direction step function.

* * * * *